(12) United States Patent
Kerwin et al.

(10) Patent No.: US 12,344,052 B2
(45) Date of Patent: Jul. 1, 2025

(54) ROBOTIC TIRE MOUNTER

(71) Applicant: ARKK ENGINEERING, Oak Park, MI (US)

(72) Inventors: Kevin R. Kerwin, Orion Township, MI (US); Daniel Ehlke, Oak Park, MI (US); Mohammed Hassan, Oak Park, MI (US)

(73) Assignee: International Wheel and Tire, Inc., Farmington Hills, MI (US)

( * ) Notice: Subject to any disclaimer, the term of this patent is extended or adjusted under 35 U.S.C. 154(b) by 783 days.

(21) Appl. No.: 15/747,822

(22) PCT Filed: Jul. 29, 2016

(86) PCT No.: PCT/US2016/044684
§ 371 (c)(1),
(2) Date: Jan. 26, 2018

(87) PCT Pub. No.: WO2017/019953
PCT Pub. Date: Feb. 2, 2017

(65) Prior Publication Data
US 2018/0215212 A1 Aug. 2, 2018

Related U.S. Application Data

(60) Provisional application No. 62/199,039, filed on Jul. 30, 2015.

(51) Int. Cl.
*B60C 25/05* (2006.01)
*B25J 15/02* (2006.01)
*B60C 25/132* (2006.01)

(52) U.S. Cl.
CPC ........ *B60C 25/0515* (2013.01); *B25J 15/024* (2013.01); *B60C 25/0584* (2013.01); *B60C 25/0587* (2013.01); *B60C 25/132* (2013.01)

(58) Field of Classification Search
CPC ........... B20C 25/0515; B20C 25/0539; B20C 25/0587; B20C 25/0584; B25J 15/024
See application file for complete search history.

(56) References Cited

U.S. PATENT DOCUMENTS 2,312,072 A * 2/1943 Tenger ................... B62D 55/20
305/161
3,157,387 A * 11/1964 Pinter ................... B60C 25/142
254/50.3

(Continued)

FOREIGN PATENT DOCUMENTS

WO WO-2008063212 A2 * 5/2008 ........... B60C 25/132

OTHER PUBLICATIONS

International Search Report for PCT/US2016/044684, Completed by the U.S. Patent and Trademark Office on Nov. 16, 2016, 4 Pages.

*Primary Examiner* — Makena S Markman
(74) *Attorney, Agent, or Firm* — Brooks Kushman, P.C.

(57) ABSTRACT

A robotic tire mounter for mounting a tire to a wheel is disclosed. The robotic tire mounted comprises a robotic arm and a gripping unit. The gripping unit further comprises a plurality of gripping fingers that are selectively moveable between a releasing position and a gripping position. When in the gripping fingers are in the releasing position, the gripping fingers are positioned adjacent one another adjacent a center of the gripping unit. A method of mounting a tire to a wheel using a robotic tire mounter is also disclosed.

7 Claims, 8 Drawing Sheets

(56) References Cited

U.S. PATENT DOCUMENTS

| | | | | |
|---|---|---|---|---|
| 3,854,614 | A | * | 12/1974 | Albrecht .................. B23Q 7/05 |
| | | | | 414/432 |
| 4,262,727 | A | * | 4/1981 | Schifferly ............. B60C 25/132 |
| | | | | 157/1.24 |
| 5,566,466 | A | * | 10/1996 | Hearne ................... B25B 5/147 |
| | | | | 34/58 |
| 6,615,649 | B1 | * | 9/2003 | Kokubu ............. B29D 30/0016 |
| | | | | 157/1.17 |
| 7,267,155 | B2 | * | 9/2007 | Brahler, II .............. B60C 25/02 |
| | | | | 157/1.17 |
| 7,699,087 | B2 | * | 4/2010 | Rogalla ............... B60C 25/0515 |
| | | | | 157/1.1 |
| 8,538,579 | B2 | * | 9/2013 | Cottone ................. B25J 9/1697 |
| | | | | 414/730 |
| 8,678,066 | B2 | * | 3/2014 | Mani .................... B60C 25/142 |
| | | | | 157/1.17 |
| 2011/0284170 | A1 | | 11/2011 | Lemser et al. |
| 2012/0267055 | A1 | | 10/2012 | Rogalla et al. |
| 2013/0168028 | A1 | | 7/2013 | Lawson et al. |
| 2016/0129739 | A1 | * | 5/2016 | Mariani ............... B60C 25/138 |
| | | | | 157/1.24 |

* cited by examiner

PRIOR ART

ROBOTIC TIRE MOUNTER

CROSS-REFERENCE TO RELATED APPLICATION

This application is the U.S. national phase of PCT Application No. PCT/US2016/044684 filed on Jul. 29, 2016, which claims the benefit of U.S. Provisional Application No. 62/199,039 filed Jul. 30, 2015, the disclosure of which are incorporated in their entirety by reference herein.

TECHNICAL FIELD

The present disclosure relates to a robotic tire mounter for an automated tire and wheel assembly.

BACKGROUND

Robotic systems for mounting tires to wheels in an automated assembly operation are known. In typical arrangements, the tire is handled and mounted using a gripper, which is attached to a pivot arm of a handling robot and is configured to be able to grip and hold the tire on the outer circumference on the tread and to be able to abut against a side wall of the tire. An example of this configuration is shown in FIGS. 1-4. As shown in FIG. 1, the gripper 2 of the handling robot 1 engages the tire R on the tread 20 with holding plates 19 such that the plates 19 lie against the side wall of the tire R. The tire is then guided onto the rim F of a wheel 30 at an inclination to the horizontal, as shown in FIG. 2 and then drawn over the rim, as shown in FIG. 3. In this manner, the one side of the upper rim edge penetrates into the opening of the first tire bead facing the rim F, and the tire bead on this side passes into the rim base. The tire R is then moved into a horizontal position by the gripper 2 while continuing to approach the rim F, with the first tire bead being slipped completely over the rim flange, as shown in FIG. 3. To mount the second, upper tire bead, the gripper 2 is opened, and removed from the tire R by lifting so the tire R comes to lie on the lower rim flange 32 and the platform 31. The gripper 2 is then moved into a closed position, with the holding plates 19 lying against one another, as shown in FIG. 4.

While automated, the gripper of the above configuration is relatively heavy in that the gripper arms must be sufficiently long enough to extend around the exterior surface of the tire. Moreover, because the gripper of the handling robot is pressed against the treads, there is a greater likelihood of damage to the tires. Thus, a configuration that is lighter and will reduce the likelihood of damage to the tires during transport is needed.

SUMMARY

A robotic tire mounter for mounting a tire to a wheel is disclosed, as well as a method of operating the robotic tire mounter. The robotic tire mounter includes a robotic arm and a gripping unit. The gripping unit further comprises a plurality of gripping fingers that are selectively moveable between a releasing position and a gripping position.

In one exemplary arrangement, the gripping unit further comprises moveable platforms that carry the gripping fingers. In one exemplary arrangement, the moveable platforms are configured to move linearly away from each other from the releasing position to the gripping position. In another exemplary arrangement, the moveable platforms are configured to move radially away from one another from the releasing position to the gripping position.

In one exemplary arrangement, the gripping fingers each further comprise at least one grip groove disposed thereon. In one arrangement each gripping finger includes a plurality of grip grooves thereon. The depth of each grip groove may be uniform.

In one exemplary arrangement, the gripping fingers are arranged in an opposing manner such that the grip grooves of opposing gripping fingers are aligned with each other. The depth of the grip grooves vary along each gripping finger.

In one exemplary arrangement, the grip grooves are arranged on a separate sleeves that may be disposed over respective gripping fingers.

In one exemplary arrangement, a controller is operatively connected to the gripping unit. The controller is configured to selective move the gripping fingers between the releasing position and the gripping position.

A method of mounting a tire on a vehicle wheel using a robotic tire mounter having a selectively moveable gripper unit, is also disclosed. The method includes moving the gripper unit downward toward an opening of a tire while in a releasing configuration until gripping elements of the gripper unit are disposed at least partially within the opening of the tire. Next, the gripping elements are moved away from one another and into engagement with one of a first or second bead of the tire. The gripping elements are then moved away from one another a predetermined distance to a gripping position so as to slightly deform the opening of the tire. The method further comprises actuating the robotic tire mounter so as to lift the gripping unit, thereby lifting the tire, and moving the tire to a wheel. The robotic tire mounter is then actuated so as to lower the tire over the wheel and manipulate the tire over a rim of the wheel such that a rim of the wheel is disposed between the first and second beads of the tire. Finally, the gripping elements are moved from the gripping position to the releasing position.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the teachings of the present disclosure.

Figure 1:
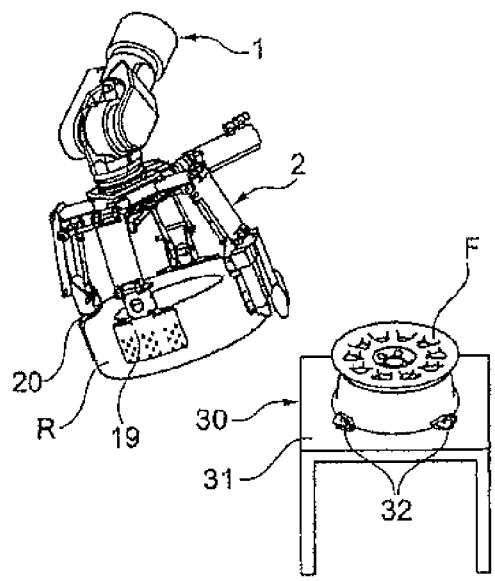
FIG. 1 is a prior art handling tire robot showing an introduction of a tire to a rim held by a fixing device.
Figure 2:
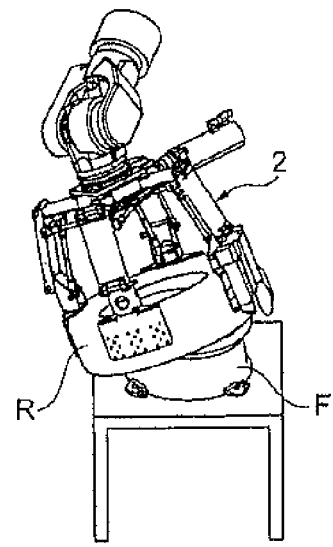
FIG. 2 is the start of attachment of the first tire bead by the handling tire robot.
Figure 3:
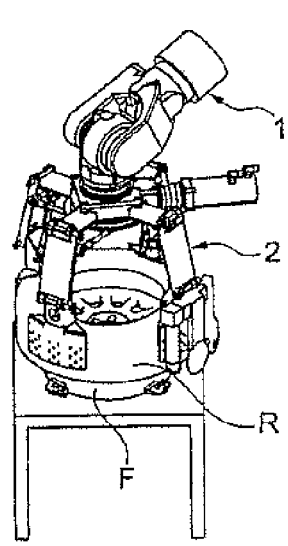
FIG. 3 shows the position of the handling tire robot after the first tire bead has been attached.
Figure 4:
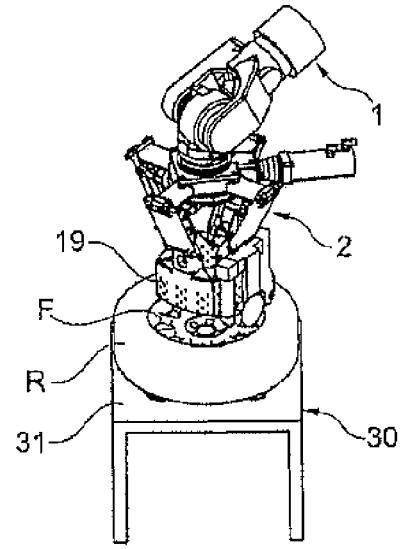
FIG. 4 shows a closed position of the gripper for attaching a second tire bead.
Figure 5:
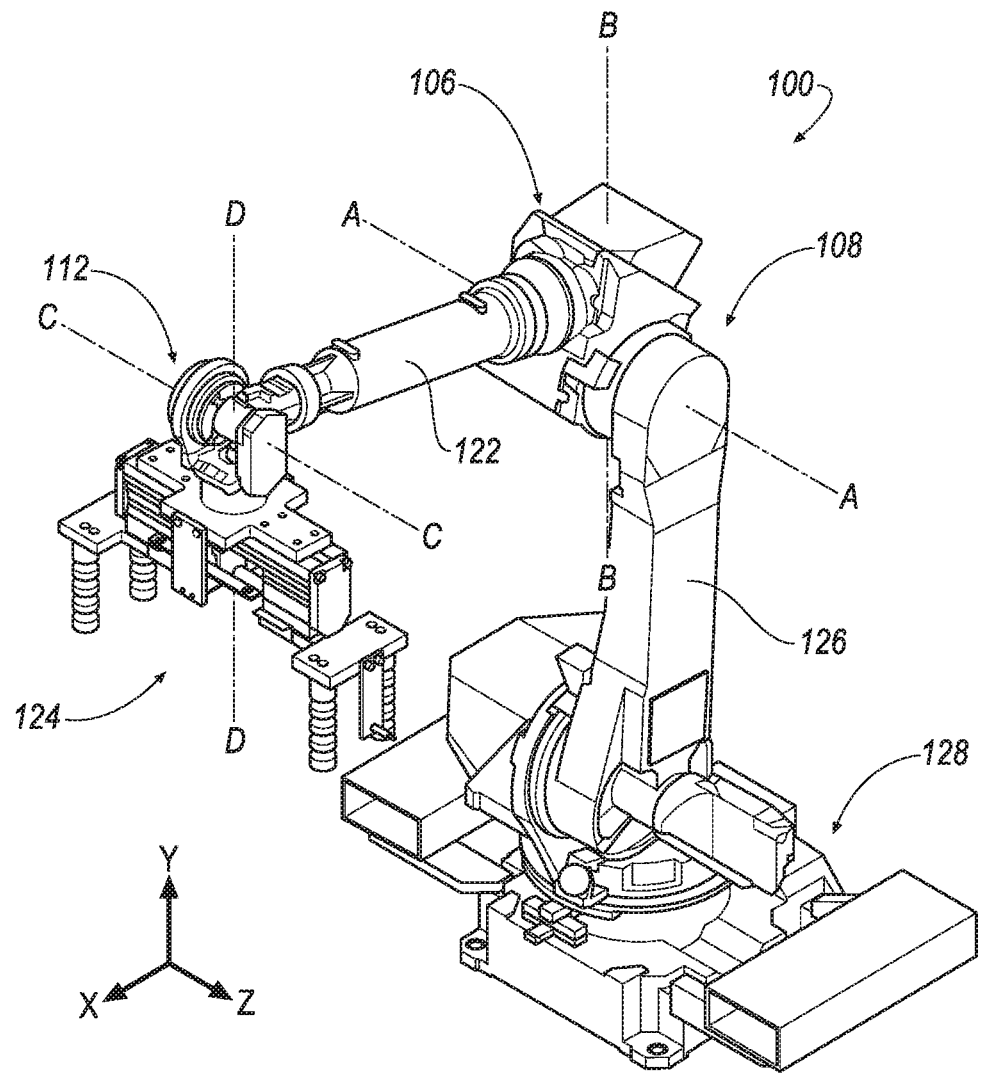
FIG. 5 is a perspective view of an exemplary robotic tire mounter.
Figure 8:
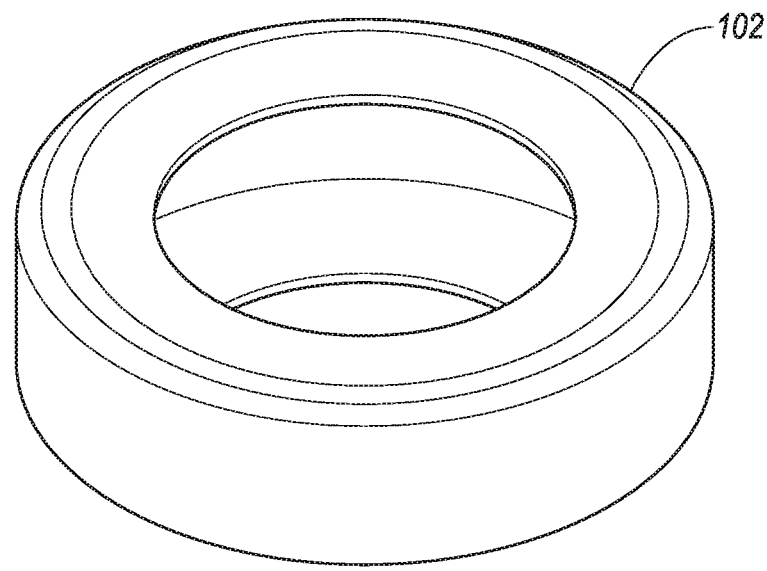
FIG. 8 is a perspective view of a tire before a gripping operation is performed.
Figure 9:
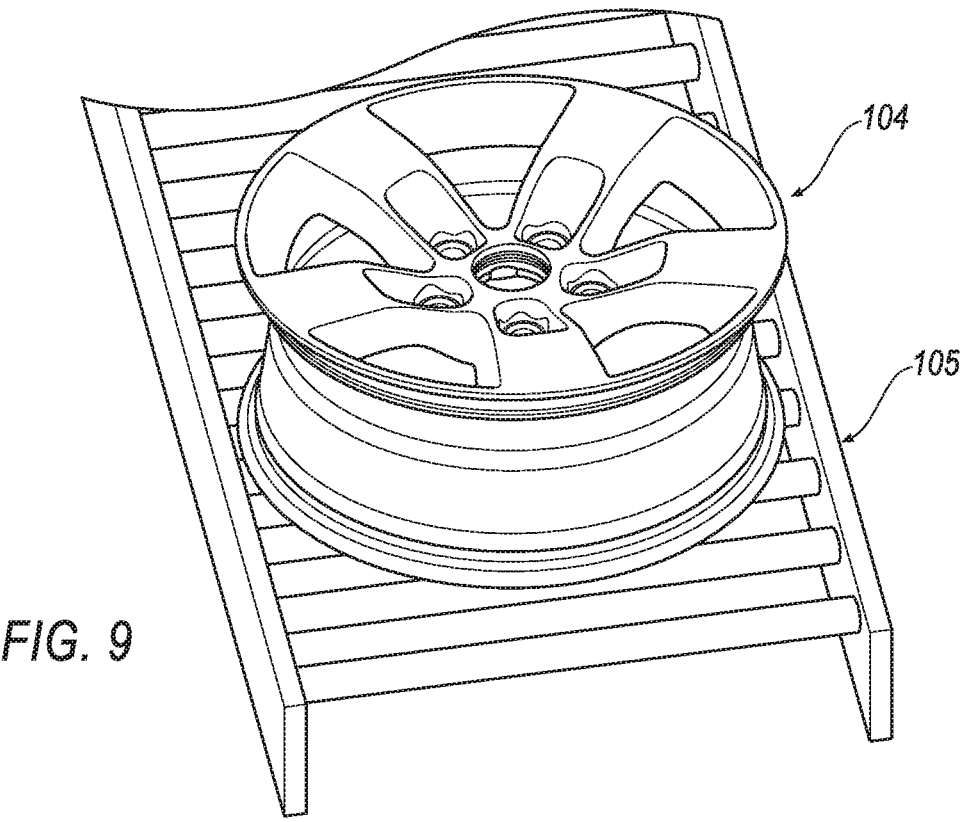
FIG. 9 is a perspective view of a wheel.

Referring to FIG. 5, a robotic tire mounter 100 that is configured for gripping a tire 102 (see FIG. 8) so as to properly mount the tire 102 onto a wheel 104 (see FIG. 9) that may be positioned on an assembly conveyor 105 or other fixing stage (not shown) is disclosed. The robotic tire mounter 100 is operable such that it is capable of picking up a tire 102 from a tire assembly area, conveying the tire 102 from the tire assembly area to a wheel mount area (i.e., conveyor 105 or other fixing stage) and mounting the tire 102 to the wheel 104. As shown in FIG. 5, the robotic tire mounter 100 may include a first articulated joint 106, a second articulated joint 108, and a wrist 112. An arm 122 is positioned between the first joint 106 and the wrist 108. The robotic tire mounter 100 is capable of movement with at least three degrees of freedom along one of a selectable plurality of programmable predetermined paths.

A gripper unit 124 is mounted to the wrist 112 of the robotic tire mounter 100. The gripper unit 124 may be selectively rotated about the wrist 112 along axis C-C, as well as along an axis D-D that is generally perpendicular to axis C-C.

The arm 122 is attached to a body portion 126 via first and second joints 106 and 108. The body portion 126 is connected to a base portion 128. In one exemplary arrangement, the body portion 126 is rotatably-connected to the base portion 128 such that the body portion 126 may be pivoted relative to the base portion 128 in about axis B-B. Further, the body portion 126 may be hinged to the base portion such that the body portion 126 may be articulated vertically relative to the base portion 128.

In one exemplary embodiment, the arm 122 may be connected to the body portion 126 such that the arm 122 may be articulated in any desirable upward or downward position relative the body portion 126. Similar to the rotatable connection of the base portion 126 and body portion 126, the gripper unit 124 may be rotatably-connected to the arm 122 such that the gripper unit 124 may be rotated, pivoted or otherwise spun 360° relative the arm 122; as will be described in further detail below.

Figure 6:
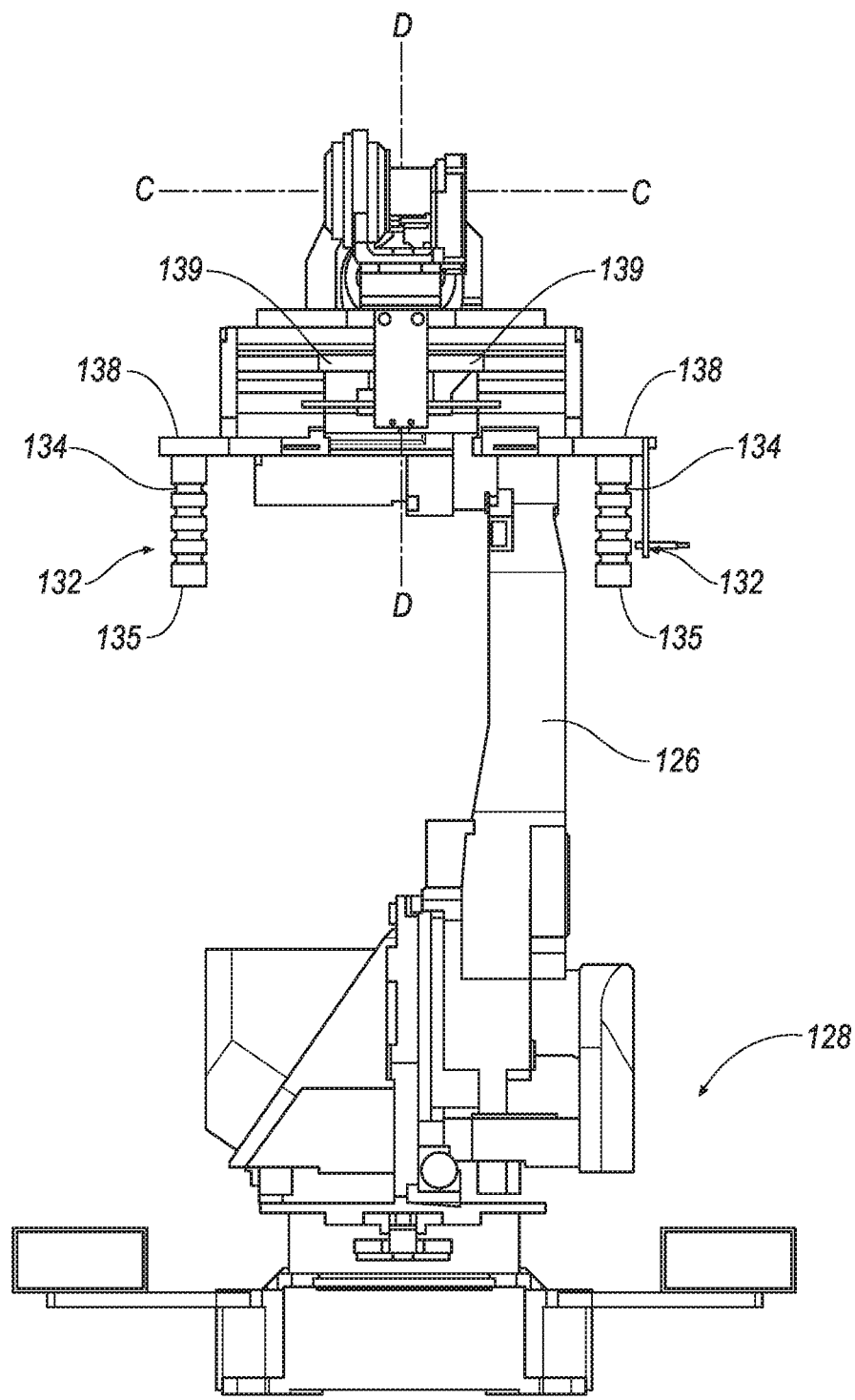
FIG. 6 is a front elevational view of the robotic tire mounter of FIG. 5.
Figure 7:
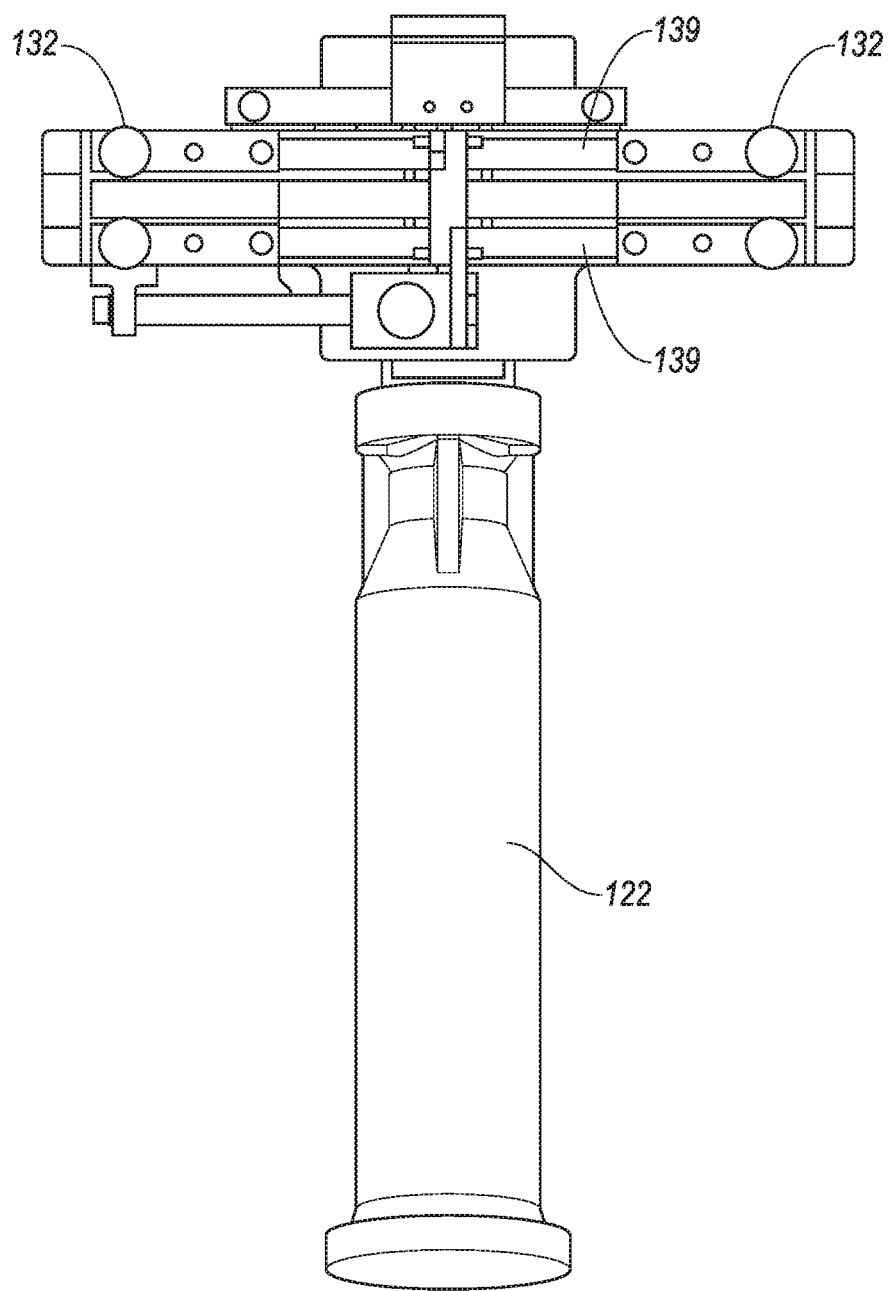
FIG. 7 is a bottom plan view of a gripper unit of the robotic tire mounter of FIG. 6.

Referring to FIG. 6, the gripper unit 124 includes a plurality of gripper fingers 132. Each gripper finger 132 further comprises one or more grip grooves 134 that are configured for selectively engaging one of the beads 142/144 of the tire 102. In one exemplary configuration, grip grooves 134 are positioned adjacent a distal end 135 of each gripper fingers 132. In another exemplary arrangement, grip grooves 134 are arranged substantially the length of the gripper fingers 132. It is further contemplated that the grip grooves 134 may be formed on a separate sleeve that may be disposed over the gripper fingers 132. With this configuration, the depths of the grip grooves 134 may be tailored for the specific tire being utilized. Alternatively, while the depths of the grip grooves 134 are illustrated as being uniform, it is also understood that the depths of the grip grooves 134 may be varied so as to accommodate a specific tire size being utilized.

In one exemplary arrangement, the gripper unit 124 includes 4 gripper fingers 132, with the gripper fingers 132 arranged in opposing pairs. However, it is also contemplated that the gripper unit 124 may be provided with three gripper fingers 132, spaced equi-distance from one another.

The gripper fingers 132 may be carried on platforms 138 that are selectively moveable along rails 139 of the gripper unit 124 between a releasing position and a gripping position. The platforms are operably connected to a controller that will move the platforms (and hence the gripper fingers 132) to the appropriate location during a tire/wheel assembly operation. In the releasing position, the platforms 138 are moved toward one another, toward such that the gripper fingers 132 are also moved toward one another toward the center of the gripper unit 124. In the gripping position, for the arrangement with four gripper fingers 132, the opposing gripper fingers 132 are moved away from one another, to a distance that is slightly larger than a diameter D1 of an opening 140 in the tire 102, as will be explained in further detail below. For a configuration with an odd number of gripper fingers 132, the platforms are moved radially away from one another, to the distance that is slightly larger than the diameter D1 of the opening 140 in the tire 102.

Figure 12:
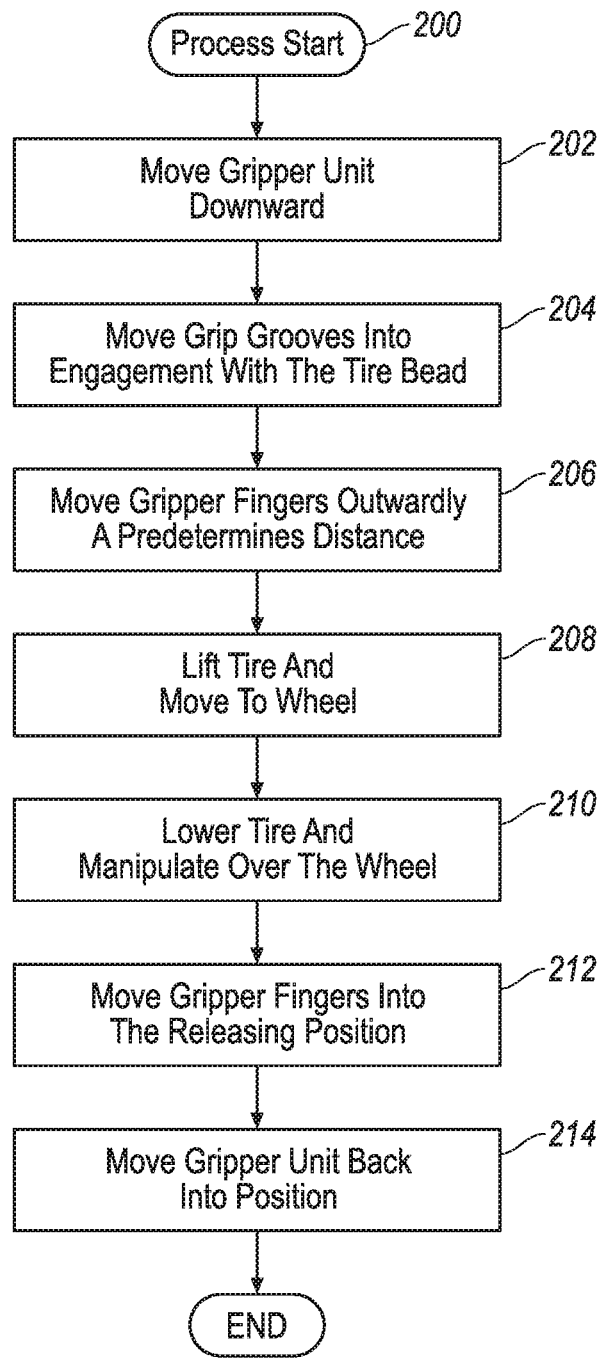
FIG. 12 is a flow chart explaining the operation of the tire/wheel assembly process.

The operation of the robotic tire mounter 100 will now be described in connection with the flow chart in FIG. 12. More specifically, in an initial step 200, the tire is initially positioned on a tire conveyor system (not shown) or a platform (not shown) in a known, conventional manner. The robotic tire mounter 100 has the arm 122 that is carrying the gripper unit 124 fully raised such that a bottom surface of the gripper fingers 132 is positioned above a top surface of the tire 102. Moreover, the gripper unit 124 is positioned in the releasing position, with the platforms 138 moved toward the central axis D-D. The gripper unit 124 is positioned directly over the tire 102 so as to be centered over the tire 102.

Figure 10:
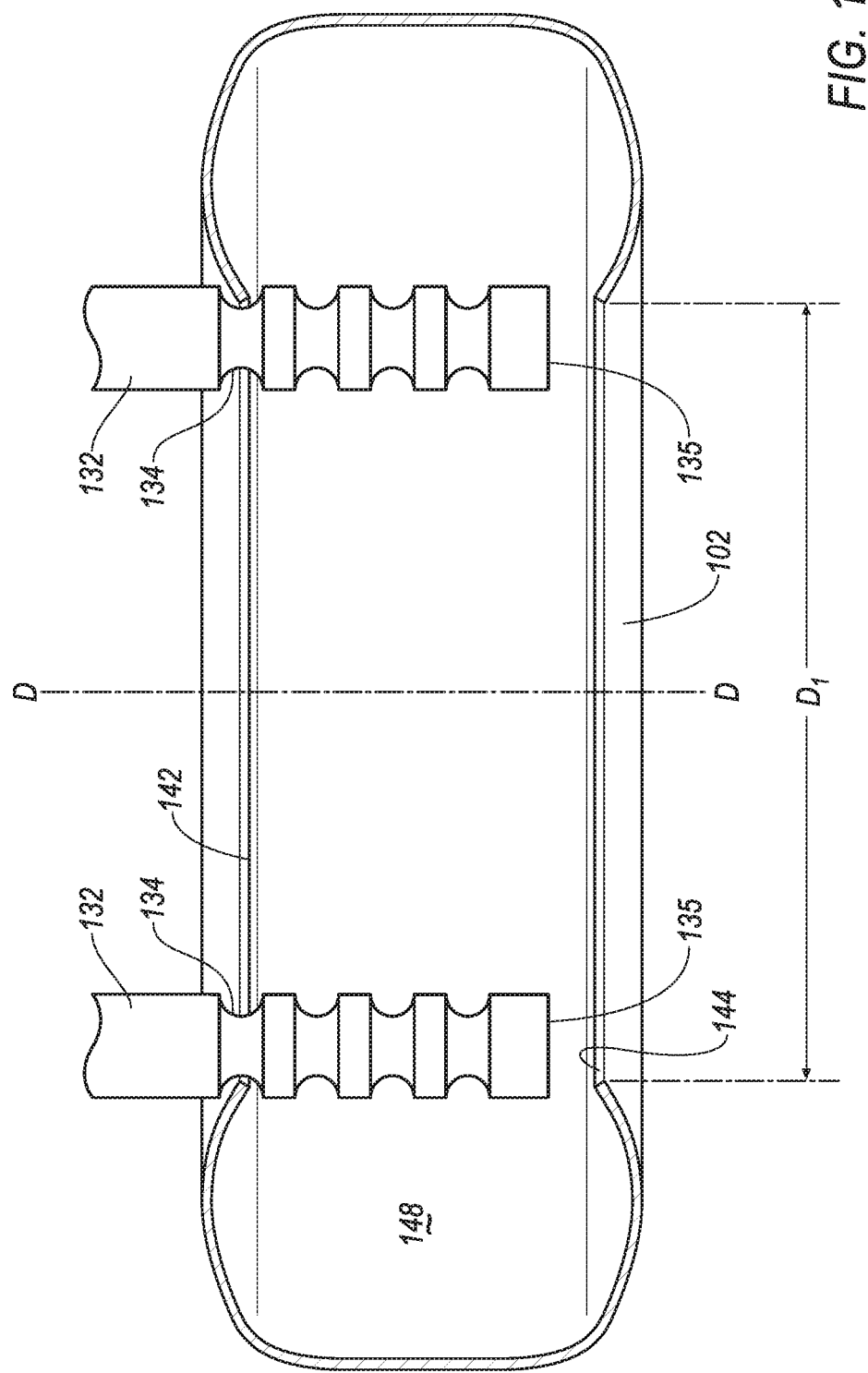
FIG. 10 is a cross-section of the tire during a gripping operation.

In step 202, the gripper unit 124 is moved downward over the wheel 102 such that the gripper fingers 132 are disposed within the opening 140 of the tire 102. In other words, gripper finger 132 breaks the plane of a top surface of the tire 102. As further explanation, in one exemplary arrangement, the distal end 135 of the gripper fingers 132 are positioned within the opening 140 of the tire 102, with a gripper groove 134 aligning with a top bead 142 of the tire 102, depending on the tire size. A controller (not shown) will calculate the distance that the gripper fingers 132 must move to align a set of gripper grooves 134 with the top bead 142 of the tire 102. Once aligned, in step 204, the platforms 138, will move away from one another (and the axis D-D) to place the grip grooves 134 into engagement with the top bead 142, as shown in FIG. 10. While described and shown as gripping the top bead 142, it is understood that the gripper fingers 132 may be used to frictionally engage with the bottom bead 144 or both the top and bottom beads.

Figure 11:
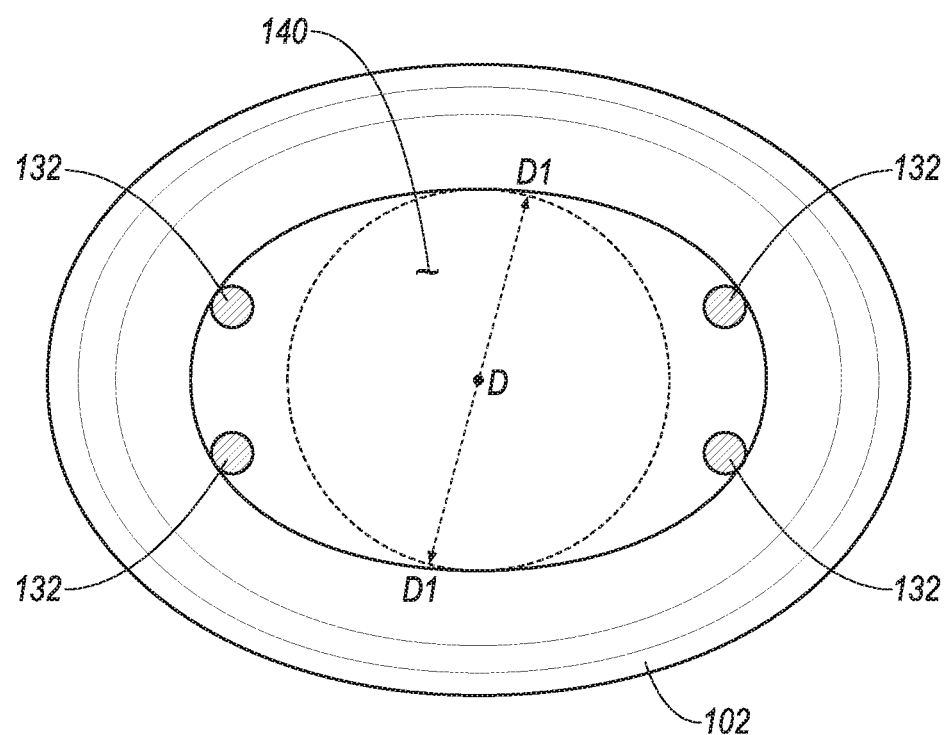
FIG. 11 is a schematic of the tire during a transport operation.

In step 206, once the grip grooves 134 are engaged with at least one of the top bead 142, the platforms are continued to be moved away from one another a predetermined distance to slightly deform the tire 102, as shown, for example in FIG. 11. With this configuration, the tire 102 is positively/frictionally engaged to the gripper unit 124. However, unlike the prior art, the treads are not likely to be damaged as the gripping fingers grips the interior of the tire.

In step 208, the arm 122 is actuated to lift the gripper unit 124 upwardly from the tire conveyor or other fixing stage. Next, the body portion 126 of the robotic tire mounter 100 is pivoted about the base 128 to move the tire 102 over to the wheel mount area.

In step 210, the arm 122 is actuated to lower the tire 102 over the wheel 104. Once moved, the gripper unit 124 is actuated to manipulate the tire 102 over the wheel. In one exemplary arrangement, the gripper unit 124 will be pivoted in a first direction about axis C-C to position the opening 140 through the bottom of the tire 102 around the upper rim 146 of the wheel 104, at an angle. With this operation, the rim 146 will be positioned slightly above the bottom bead 144 of the tire 102 in the center section 148 of a portion of the tire 102 between the top 142 and bottom beads 144. Next, the gripper unit 124 will be pivoted in a second direction about the axis C-C to force the remainder of the tire over the upper rim 146 of the wheel 104. At this point, a portion of the tire 102 will still be held slightly above the wheel 104, with the gripper fingers 132 still engaged with the tire 102. Other exemplary methods for manipulating the tire 102 over the wheel 104 includes undulating the tire 102, using a corkscrew action or a roll-on action.

In step 212, the platforms 138 are then actuated to move back into the releasing configuration. More specifically, the platforms 138 are moved inwardly toward the axis D-D. With this action, the tire 102 is released from the gripper fingers 132 and will fall into position onto the wheel 104.

In step 214, the gripper unit 124 is moved back into position at the tire conveyor system and the process is either repeated or ended.

The above configuration of the robotic tire mounter and operation of same, allows for a quick and efficient assembly process, while minimizing damage to tire treads, or other aspects of the tire. This process also minimizes damage to the wheel during assembly. Further, by using the movable gripper fingers 132, the present configuration is easily adjustable for multiple sized tires/wheels.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of mounting a tire on a vehicle wheel using a robotic tire mounter having a selectively moveable gripper unit, the method comprising:
   providing the robotic tire mounter, wherein the robotic tire mounter comprises:
   a robotic arm and the selectively movable gripper unit;
   wherein the gripping unit further comprises a plurality of gripping fingers and movable platforms;
   wherein the plurality of gripping fingers are configured to engage with at least one of a first or second bead of the tire from an opening of the tire, the gripping fingers being selectively moveable between a releasing position and a gripping position;
   wherein the movable platforms are each configured to carry a respective gripping finger of the plurality of gripping fingers, the movable platforms are configured to move linearly away from each other from the releasing position to the gripping position;
   wherein the gripping fingers each include a sleeve element configured to be disposed over a respective gripping finger of the plurality of gripping fingers, each sleeve element comprising a plurality of grip grooves disposed thereon;
   wherein the gripping fingers are arranged in an opposing manner such that the grip grooves of opposing gripping fingers are aligned with each other, and wherein the depth of the grip grooves along each gripping finger vary to accommodate for various tire sizes;
   moving the gripper unit downward toward the opening of the tire while in the releasing position until the gripping fingers of the gripper unit are disposed at least partially within the opening of the tire;
   moving the gripping fingers away from one another and into engagement with one of the first or second bead of the tire;
   continue moving the gripping fingers away from one another a predetermined distance to the gripping position so as to slightly deform the opening of the tire;
   actuating the robotic tire mounter so as to lift the gripping unit, and thereby lifting the tire, and moving the tire to a wheel;
   actuating the robotic tire mounter so as to lower the tire over the wheel and manipulate the tire over a rim of the wheel such that the rim of the wheel is disposed between the first and second beads of the tire; and
   moving the gripping fingers from the gripping position to the releasing position.

2. The method of claim 1, wherein moving the gripping fingers into engagement with one of the first or second bead of the tire comprises positioning one or more of the grip grooves on the first or second bead of the tire.

3. The method of claim 1, wherein manipulating the tire further comprises presenting the opening through the tire on a bottom surface of the tire to the rim of the wheel at an angle so as to slip the tire over a portion of the rim, and moving the tire into a horizontal position so as to dispose a remainder of the tire over the rim.

4. A robotic tire mounter for mounting a tire to a wheel, comprising:
   a robotic arm; and
   a gripping unit;
   wherein the gripping unit further comprises a plurality of gripping fingers and moveable platforms;
   wherein the gripping fingers are configured to extend into an opening of a tire and are selectively moveable between a releasing position and a gripping position;
   wherein the moveable platforms are configured to carry the gripping fingers and move linearly away from each other from the releasing position to the gripping position;
   wherein when the gripping fingers are in the releasing position, the gripping fingers are positioned adjacent one another adjacent a center of the gripping unit, and wherein the gripping fingers are in the gripping position when the gripping fingers engage at at least two locations at the inside of the tire to deform the opening of the tire;
   wherein the gripping fingers each include a sleeve element configured to be disposed over a respective gripping finger of the plurality of gripping fingers, each sleeve element comprising a plurality of grip grooves disposed thereon; and
   wherein the gripping fingers are arranged in an opposing manner such that the grip grooves of opposing gripping fingers are aligned with each other, and wherein the depth of the grip grooves along each gripping finger vary to accommodate for various tire sizes.

5. The robotic tire mounter of claim 4, further comprising a controller operatively connected to the gripping unit, the controller configured to selectively move the gripping fingers between the releasing position and the gripping position.

6. A robotic tire mounter for mounting a tire to a wheel, comprising:
- a robotic arm;
- a gripping unit;
- wherein the gripping unit further comprises a plurality of gripping fingers configured to engage with at least one of a first or second bead of the tire from an opening of the tire, the gripping fingers being selectively moveable between a releasing position and a gripping position;
- wherein the gripping unit further comprises moveable platforms that each carry the gripping fingers, the moveable platforms are configured to move linearly away from each other from the releasing position to the gripping position;
- wherein the gripping fingers each include a sleeve element configured to be disposed over a respective gripping finger of the plurality of gripping fingers, each sleeve element comprising a plurality of grip grooves disposed thereon; and
- wherein the gripping fingers are arranged in an opposing manner such that the grip grooves of opposing gripping fingers are aligned with each other, and wherein the depth of the grip grooves along each gripping finger vary to accommodate for various tire sizes.

7. The robotic tire mounter of claim 6, further comprising a controller operatively connected to the gripping unit, the controller configured to selectively move the gripping fingers between the releasing position and the gripping position.

* * * * *